United States Patent [19]

Schoon

[11] Patent Number: 5,565,906
[45] Date of Patent: Oct. 15, 1996

[54] CLOCKING MEANS FOR BANDWISE IMAGING DEVICE

[75] Inventor: David J. Schoon, Mendota Heights, Minn.

[73] Assignee: Schoonscan, Inc., Mendota Heights, Minn.

[21] Appl. No.: 181,574

[22] Filed: Jan. 13, 1994

[51] Int. Cl.⁶ .................................. B41J 2/47
[52] U.S. Cl. ........................... 347/248; 347/234
[58] Field of Search ................. 347/132, 79, 237, 347/247, 248, 234

[56] References Cited

U.S. PATENT DOCUMENTS

| | | | |
|---|---|---|---|
| 3,618,736 | 11/1971 | Abell, Jr. et al. | 197/17 |
| 3,698,006 | 10/1972 | Ovshinsky | 347/132 |
| 3,934,698 | 1/1976 | McGourty | 197/90 |
| 4,122,496 | 10/1978 | Childress et al. | 358/298 |
| 4,312,004 | 1/1982 | Samek et al. | 346/1.1 |
| 4,389,655 | 6/1983 | Baues | 346/107 R |
| 4,435,064 | 3/1984 | Tsukada et al. | 355/1 |
| 4,542,392 | 9/1985 | Schulz-Hennig | 346/160 |
| 4,571,623 | 2/1986 | Schoon | 358/208 |
| 4,586,057 | 4/1986 | Schoon | 346/108 |
| 4,630,223 | 12/1986 | Schoon | 364/518 |
| 4,686,363 | 3/1987 | Schoon | 250/235 |
| 4,739,416 | 4/1988 | Manian | 358/302 |
| 4,746,942 | 5/1988 | Moulin | 354/5 |
| 4,761,057 | 8/1988 | Zak et al. | 350/273 |
| 4,800,396 | 1/1989 | Hertz | 347/79 |
| 4,867,543 | 9/1989 | Bennion et al. | 350/384 |
| 4,897,672 | 1/1990 | Horiuchi et al. | 346/107 R |
| 4,899,223 | 2/1990 | Springer et al. | 358/302 |
| 4,951,064 | 8/1990 | Kun et al. | 346/107 R |
| 4,967,240 | 10/1990 | Kitano et al. | 355/318 |
| 4,999,558 | 3/1991 | Onodera et al. | 318/685 |
| 5,040,003 | 8/1991 | Willis | 346/157 |
| 5,054,893 | 10/1991 | Schoon | 359/254 |
| 5,164,742 | 11/1992 | Baek et al. | 346/76 |
| 5,168,288 | 12/1992 | Baek et al. | 346/76 L |
| 5,225,851 | 7/1993 | Schoon | 346/108 |
| 5,274,397 | 12/1993 | Grover | 346/108 |

FOREIGN PATENT DOCUMENTS

| | | |
|---|---|---|
| 0112518 | 7/1984 | European Pat. Off. . |
| 189664 | 8/1986 | European Pat. Off. . |
| 0192486 | 8/1986 | European Pat. Off. . |
| 0264341 | 4/1988 | European Pat. Off. . |
| 0506410A2 | 9/1992 | European Pat. Off. . |
| 0529532 | 3/1993 | European Pat. Off. . |
| 1128199 | 4/1962 | Germany . |
| 3643214A1 | 6/1988 | Germany . |

Primary Examiner—Mark J. Reinhart
Attorney, Agent, or Firm—Merchant, Gould, Smith, Edell, Welter & Schmidt, P.A.

[57] ABSTRACT

An electro-optic imager, used for exposing photosensitive media, wherein a moving drum or mirror(s) are used to obtain a scanning action, and a plurality of scanning beams is preferably used. An encoder, preferably a radial optical ruling and two or more optical interrupters, is attached to a shaft connected to the moving drum or mirrors which cause the optical scanning action. The output from the interrupters is processed in circuitry which interpolates position, generating clocks much faster than the rate of signals received by the interrupters, and responding quickly to any speed changes which might occur.

19 Claims, 4 Drawing Sheets

CLOCKING MEANS FOR BANDWISE IMAGING DEVICE

FIELD OF THE INVENTION

The present invention relates to imaging devices, and more particularly to imaging devices where an image is recorded on photosensitive media by a plurality of light beams.

BACKGROUND OF THE INVENTION

Imagers, usually laser imagers, are used to record electronically produced information on photographically sensitive media (e.g. photographic film or paper; or photoconductive drums, as in laser printers). Such devices are used in applications wherein information exists in an electronic form and a visually observable presentation of the information is desired. Typically a single beam of light is directed sequentially across a photosensitive media, in a raster scan fashion. Typically a laser (e.g. a gas laser beam) is used to create the beam.

Such imagers are used to create images when a computer is used to control or create the image information. Examples of the functions which are best done with computer assistance are: (1) size adjustment and cropping; (2) combinations of same or other photos into a layout; (3) addition of text or other graphics to photos; (4) color corrections (e.g. correction for use of daylight film with incandescent lighting); (5) unsharp masking (i.e. electronic sharpening of a photograph); (6) darkness and contrast adjustments; and (7) retouching. Hardcopy images are also needed when printing plates are being prepared, and a proof of the electronic image information must be obtained prior to preparation of printing plates from that same image information. Another example of needs for electronic imagers is in the preparation of medical x-rays (e.g. from CAT [Computerized Axial Tomography] or NMR [Nuclear Magnetic Resonance] scans).

Since laser imagers usually image with a single beam of light, a high relative speed of the beam with respect to the media is generally necessary in order to obtain acceptable overall speeds. One prior design involves wrapping the photosensitive media around the outside of a drum. The drum is spun rapidly while the optical position of the beam is advanced slowly and continuously with a leadscrew.

Another common design involves using a rapidly spinning polygon mirror which deflects the light onto the photosensitive media. The media is usually moved slowly past the optical system in a direction perpendicular to the direction of scan.

The moving element in each system is used to obtain a raster scanning action in one direction. A clock is used to control data flow. If that clock is out of synchronization with the mechanical action, image discontinuities will occur. Due to a number of practical physical limitations in controlling the mechanical actions of these systems, it is often difficult to accurately synchronize the data flow and mechanical action to produce high quality images free from discontinuities.

Specifically, both prior systems require that the rapidly moving component (the drum in the first case, or the polygon mirror in the second case) move with little if any variation in speed. If this is not the case image elements which should line up from scan line to scan line might not do so, but rather appear nonuniform. Industry jargon calls these nonuniformities "jaggies" since lines or object boundaries which should appear smooth appear instead jagged. A second consequence of nonuniform motion would be undesired variations in opacity, especially if the images which are being created are continuous tone images.

It is also required that the slowly moving component (the light beam in the first case, or the media in the second case) move uniformly. If this is not the case, undesired variations in opacity will result. More specifically, increased exposure will result when the scan lines are too close together and decreased exposure will result when the scan lines are too far apart. These conditions would result from media motion which is too slow or too fast, respectively.

In order to minimize these imperfections, various electronic controls and high mechanical precision are typically used in various components in order to synchronize data flow with mechanical action. Considerable cost is involved both in these controls and in the high mechanical precision. Consequently, a need exists in the art for a lower cost synchronization scheme for reducing variations and discontinuities to produce high quality images.

SUMMARY OF THE INVENTION

The present invention addresses these and other problems associated with the prior art in providing optical scanning of a photosensitive media wherein the spacing between pixels in the scan direction is extremely uniform, (i.e., not having significant variations in spacing between various pixels) so that discontinuities are minimized in the scanned images. Further, the invention provides these high quality images with a comparatively low cost of manufacturing, not requiring expensive machining of mechanical components or expensive electronic controls as has heretofore generally been required.

The invention is preferably used in an imaging system in which a plurality of light beams is used for imaging (e.g. 20-200 beams). In such a system, the photosensitive media is wrapped around a rotating drum (or cylinder), but the drum is rotated more slowly than is generally feasible with prior art devices. The imaging occurs in discrete bands with no movement of the optical system during the imaging process.

Because many light beams are used simultaneously, the speed of the rotating drum is considerably slower than would be the case if a single light beam were used. This presents many advantages. On many prior imaging systems, shaking of an imager resulting from unbalanced forces on a rapidly spinning drum would result in flexure of optical components, resulting in undesirable distortion of images. Obtaining a balancing of these forces is costly and difficult. However, when using a slower rotating drum, lower centrifugal forces are generated, so clamps for paper or film on the drum do not need to be precisely balanced. Moreover, on a slowly rotating drum centrifugal forces do not tend to bow the film or paper away from the drum, undesirably pulling it out of the focal plane.

Another advantage resulting from the slow rotational speed of the drum is that imaging may be done in bands, rather than having to be done helically. As explained in my copending application "Spatial Stabilization for Bandwise Imaging Device", filed on an even date herewith, the bandwise imaging also presents the opportunity for fine adjustment of band to band spacing during times when no imaging occurs, so that cross-scan spatial alignment is precise. This disclosure is also hereby incorporated by reference herein to the extent necessary to support this disclosure.

On the other hand, because the drum spins relatively slowly, the ratio of frictional forces to inertial forces may be higher than would be the case if the drum spun more rapidly. This being the case, it is often more difficult to maintain an acceptably constant rotational velocity of the drum. If the clock which controls data flow to the light modulating means oscillates at a constant rate (as is the case in prior imagers) and the drum speed varies even slightly, objects imaged on successive rotations of the drum may not line up with each other properly, and an undesirable discontinuity may result.

One possible solution to this problem would be to have absolutely precise rotation of the drum. This is generally not possible however because of the high ratio of frictional to inertial forces, the latter being small because of the comparatively slow speed of rotation. Rotational speeds used with the present invention may be preferably in the order of 0.5–3 revolutions per second, whereas rotational speeds of many prior external drum scanners (wherein imaging is done one beam at a time) are generally in the range of 10–100 revolutions per second. Moreover, the cost of manufacture of many prior drums is considerably higher than is the case for drums for use with the present invention. The approach of the subject invention is to provide clocking of data which speeds up or slows down in concert with the drum velocity so as to maintain synchronization and provide clocking which follows the exact drum position.

In accordance with one aspect of the invention, there is provided an apparatus for synchronizing dataflow with movement of photosensitive media in an imaging system of the type having a media transport means for moving photosensitive media and a data transmission means for providing a flow of image data to an imaging means at a rate determined by a clocking signal. The apparatus includes a positional sensing means, operatively connected to the media transport means, for generating a positional signal representative of the position of a photosensitive media relative to the imaging means. Further, the apparatus includes a clocking means for generating a clocking signal which is tunable among a plurality of frequencies by a clocking control signal, and a control means for comparing the positional signal with a reference positional signal representative of an expected position of the photosensitive media, and providing the clocking control signal to the clocking means to tune the clocking means such that the frequency of the clocking signal is adjusted to compensate for the deviation of the position of the photosensitive media from its expected position.

In accordance with another aspect of the invention, an imaging apparatus is provided which incorporates the above-described synchronizing apparatus.

In accordance with a further aspect of the invention, there is provided a method for synchronizing dataflow with movement of photosensitive media in an imaging system of the type described above. The method includes the steps of sensing the position of a photosensitive media relative to the imaging means and generating a positional signal representative thereof, comparing the positional signal with a reference positional signal representative of an expected position of the photosensitive media and generating a clocking control signal having a component representing a deviation of the position of the photosensitive media from its expected position, and applying the clocking control signal to the data transmission means such that the frequency of the clocking signal is adjusted to compensate for the deviation of the position of the photosensitive media from its expected position.

In a preferred embodiment, a rotary encoder is attached to the shaft of a drum. This encoder preferably includes a radial ruling and which is sensed by two stationary optical interrupters. The optical interrupters are spaced so as to provide output signals which are 90° out of phase with each other. The outputs from each of the optical interrupters are inverted in an electronic circuit to provide signals at a 0°, 90°, 180°, and 270° phase relationship. A multiplexer selects one of these four signals, compares it to the voltage level which would be expected for that particular region, and adjusts the voltage to a voltage controllable oscillator (VCO) to be faster or slower than its nominal speed, thus compensating for differences between total clock pulses and actual drum position. With an 8-bit digital to analog (d/a) converter, even if the signal span is only ½ of the total range (i.e. 128 steps), with four quadrants per ruling cycle, the space between rulings is resolvable to (4×128=) 512 steps. This degree of resolution is significantly improved over many encoders found in the prior art.

These and other advantages and features, which characterize the invention are pointed out with particularity in the claims annexed hereto and forming a part hereof. However, for a better understanding of the invention, its advantages and objectives attained by its use, reference should be made to the drawing which forms a further part hereof and to the accompanying descriptive matter, in which there is described a preferred embodiment of the invention.

DETAILED DESCRIPTION OF THE PREFERRED EMBODIMENT

My issued U.S. Pat. Nos. 5,054,893 and 5,225,851, and co-pending application Ser. Nos. 07/827,061 and 07/884,408 (filed on Jan. 28, 1992 and May 18, 1992, respectively) discuss various methods of imaging with multiple parallel beams of light. To the extent they are required to support this disclosure, the disclosures of these references are incorporated by reference herein. In summary, according to these patents and applications, a plurality (e.g., 64) of light beams are generated using PLZT electro-optic light modulators to control more or less collimated light. By writing to a photosensitive media with multiple beams, a high overall speed (square inches of image generated per second) is obtained even with a small relative speed between any beam and the media. Because this speed is small the images can be created in bands, with the imaging system alternating between (1) imaging a band (e.g., 0.2" wide), with no movement of the optical system in the cross-scan direction, and (2) movement of the optical system in the cross-scan direction, with no imaging occurring.

Figure 1:
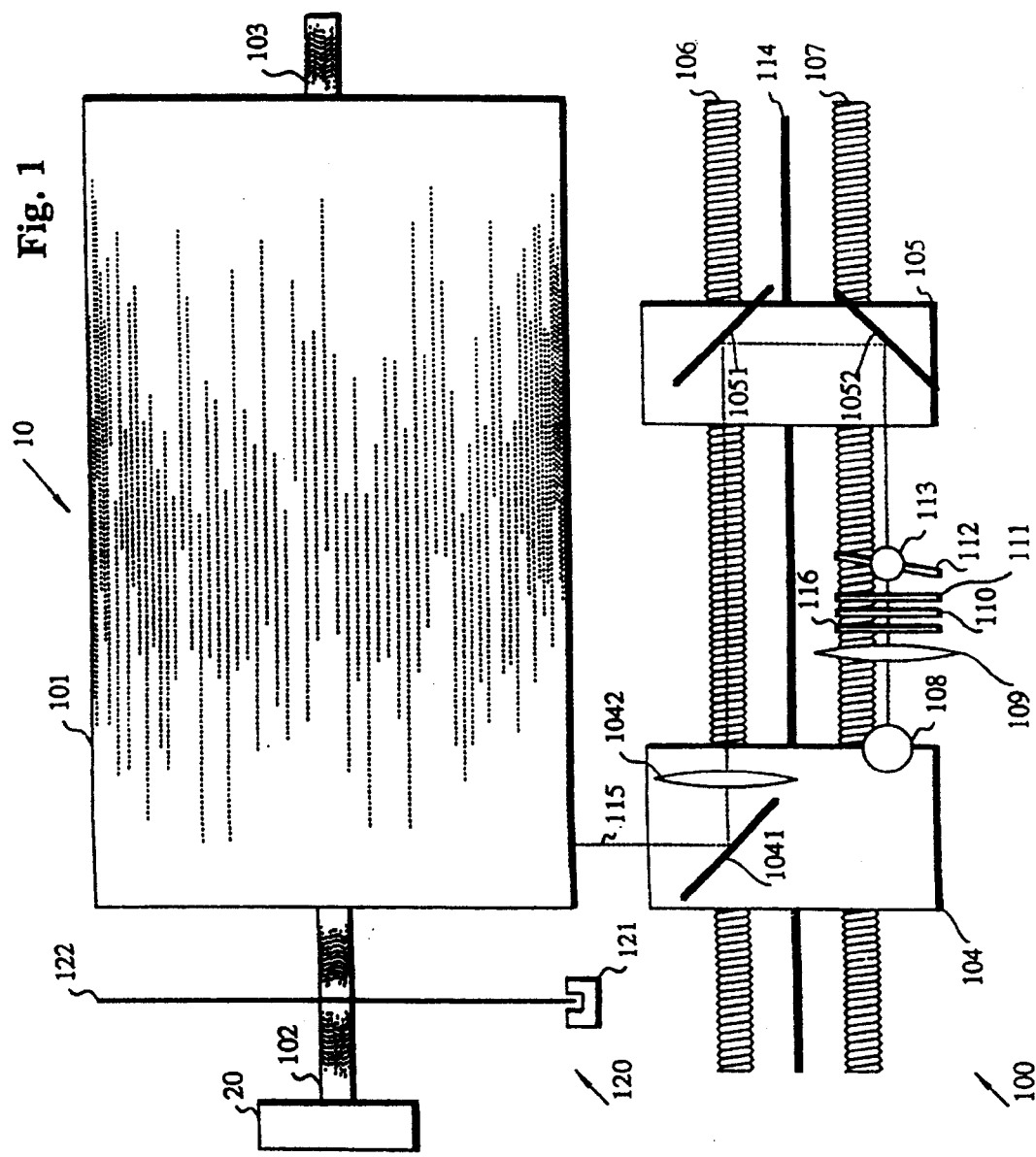
FIG. 1 is a plan view of an imaging system consistent with the present invention.

Turning to the figures, wherein like numbers denote like parts throughout the several views, FIG. 1 shows a preferred imaging system design 10 consistent with the present invention. A drum or right circular cylinder, 101, is supported on shafts 102 and 103. Photographically sensitive media (e.g., Kodak Ektacolor RA photographic paper or Ektachrome film) is wrapped around the drum, emulsion side out, and held to the drum with clamps appropriate for the media.

An imaging means 100 is now described which controls the deposition of light beams onto the photosensitive media in accordance with a data flow of image data. Objective lens assembly 104, which contains first surface mirror 1041 and lens 1042, slides on guide rods (not shown) and is moved by leadscrew 106. This leadscrew is connected to a timing pulley which, via a timing belt, is turned via a stepping motor (not shown).

Mirror assembly 105, which contains first surface mirrors 1051 and 1052, also slides on guide rods (not shown) and is moved by leadscrew 107. This leadscrew is also connected to a timing pulley and to the same timing belt and stepping motor used to rotate leadscrew 106. The timing pulleys are chosen so that leadscrew 106 rotates two turns for every one turn of leadscrew 107. The two leadscrews 106 and 107 are of the same pitch. Because of this arrangement mirror assembly 105 moves half as much as objective lens assembly 104 for any given rotation of the stepping motor connected to both assemblies.

The following items are stationary and do not move: lamp 108, lens 109, filter 116, light valve 110, and aperture array 111. Glass plate 112 rotates about shaft 113. The shaft 113 does not move translationally, but does rotate about its longitudinal axis.

Lamp 108 provides light which is collected and more or less collimated by lens 109. The brightest spot of lamp 108 is focused onto objective lens 1042. The light which passes through lens 109 is filtered by filter 116, which preferably is a wheel of which one of several filter colors is selected. For color film and paper, one each of red, green, and blue filters is provided on that wheel.

Light valve array 110 is an array of light valves (e.g. two rows of 32 cells per row) together with polarizers before and after the light valve chips. The polarizers are oriented so that with no voltage on any cell the polarization vector is not rotated within the PLZT chip and little if any light passes through the second polarizer (which is crossed with respect to the first polarizer). However, if a voltage is applied to an electrode for any light valve cell, light passes in accordance with the amount of polarization rotation, up to a maximum of light when a 90° rotation occurs. Typically this maximum is about 27% of the light incident on the first polarizer.

Aperture array 111 controls the beam energy profile of each beam. My copending application Ser. No. 07/884,408 discusses the way these beam energy profiles are set so as to minimize the appearance of scan lines on the output. Array 111 is preferably one of many such arrays, chosen for the particular media and resolution selected. For some resolutions an interleaving of scan lines is used.

Glass plate 112 is rotated on shaft 113 so as to microposition the image slightly. Both of my copending application Ser. Nos. 07/827,061 and 07/884,408 discuss the way in which a rotated glass plate can microposition the image. Using Snell's law it can be easily calculated that a 1.5 mm thick glass plate with index of refraction=1.523 will move the image approximately 0.00068" for every degree of rotation.

The array of apertures is focused by lens 1042 onto drum 101. Dotted line 115 shows the optical path. The total optical distance from apertures 111 to lens 1042 is always constant since assembly 105 moves half as much as assembly 104.

The exact position of objective lens assembly 104 is preferably sensed by an optical interrupter attached to the bottom of assembly 104 (not shown) and stationary ruling 114.

A media transport means 20 moves the photosensitive media relative to the imaging means 100. In the preferred embodiment, the transport means 20 is a motor and the movement is rotational, although the photosensitive media could also be oriented in a plane and moved laterally with respect to the imaging means, or may be transported in other known manners. The drum 101 is preferably rotated at about 0.5 to 3 revolutions per second. For 300 dpi prints, the speed is preferably two revolutions per second, whereby a 20"×24" Ektacolor print may be completed in less than 4 minutes.

Figure 2:
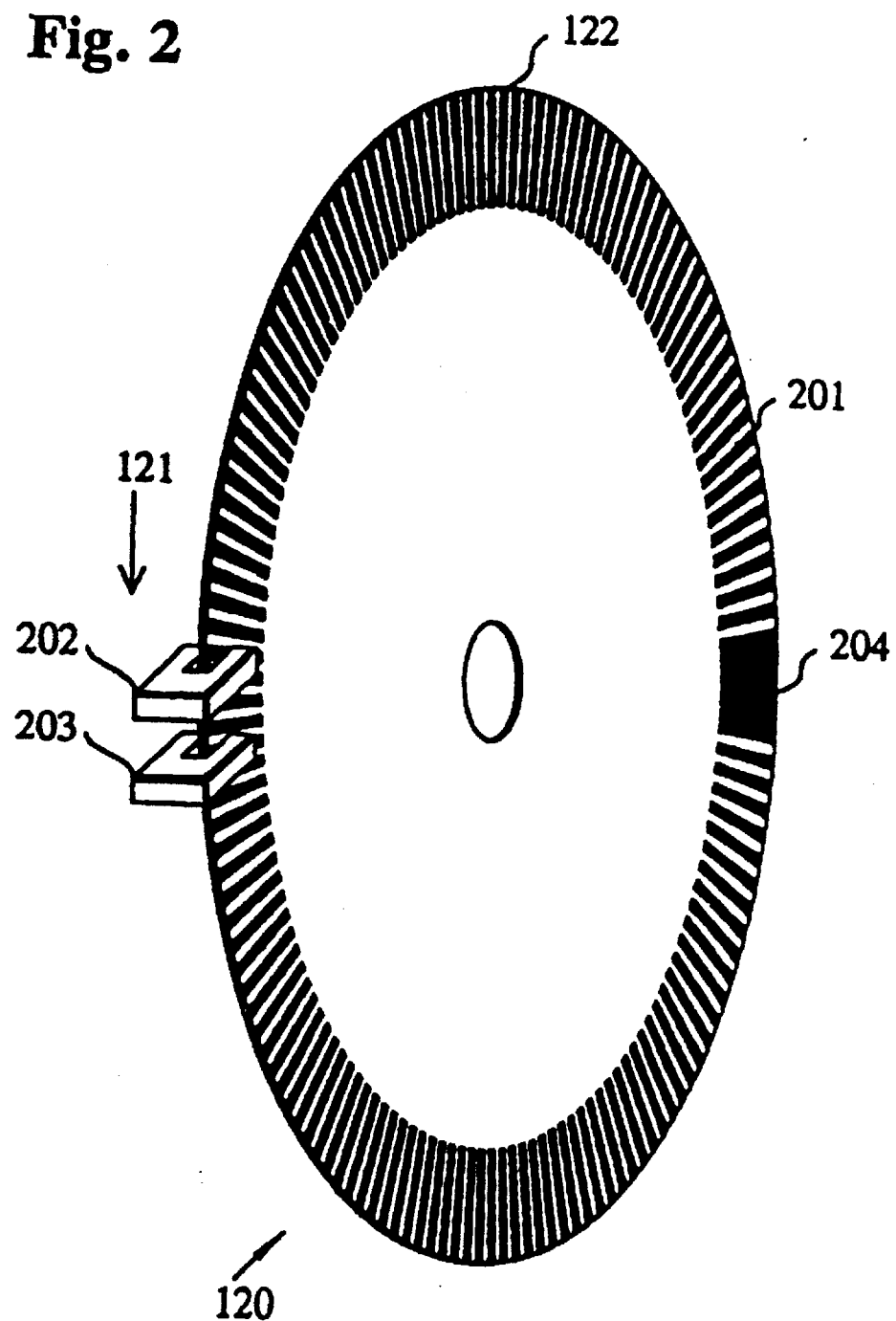
FIG. 2 is a perspective view of the encoder disk and the stationary optical interrupters shown in FIG. 1.

The rotational position of the drum is determined by a positional sensing means 120 which preferably includes an optical sensor 121 disposed about the periphery of an encoder disk 122. These items are shown in greater detail in FIG. 2.

Encoder disk 122 is fixedly attached to the drum shaft and rotates concurrently with the drum. One skilled in the art will appreciate that this disk may also be connected via gears or pulleys so long as it rotates concurrently with the drum. Encoder disk 122 has a radial ruling 201 disposed about its outer circumference which has alternating portions of transparent and opaque material. Optical sensor 121 includes two optical interrupters 202 and 203 (e.g. Motorola H22A2) which sense the local opacity of this ruling. In a preferred embodiment, the outer radius of encoder disk 122 is 3.8". The separation between the interrupters 202 and 203 is 0.24". The number of lines (i.e., opaque portions) on the radial ruling is 300. Thus, the phase separation between interrupters 202 and 203 is 3.25 cycles.

The number of lines in the radial ruling 201 on the encoder is preferably selected so that the line or space width is approximately equal to the window width of the optical interrupters 202 and 203. If the line or space width is too narrow, the range of voltage output from the interrupters is reduced and the signal to noise ratio might be compromised. However, if the line or space width of the encoder rulings is too wide, a region of voltage output which is not changing with drum rotation will be undesirably obtained; such regions contribute no information regarding drum position.

In a preferred embodiment, the drum (101, in FIG. 1) diameter is approximately 8.5". It is desired that 2400 dpi images should be created with clocking irreproducibility less than 0.1 pixel, which is equivalent to $\frac{1}{641,000}$ revolution of the drum, which is in turn $\frac{1}{2136}$ of the distance between lines on the radial ruling 201. Moreover, a resolution of one pixel in clocking is needed, which represents $\frac{1}{214}$ of the distance between lines on the ruling 201.

Figure 3:
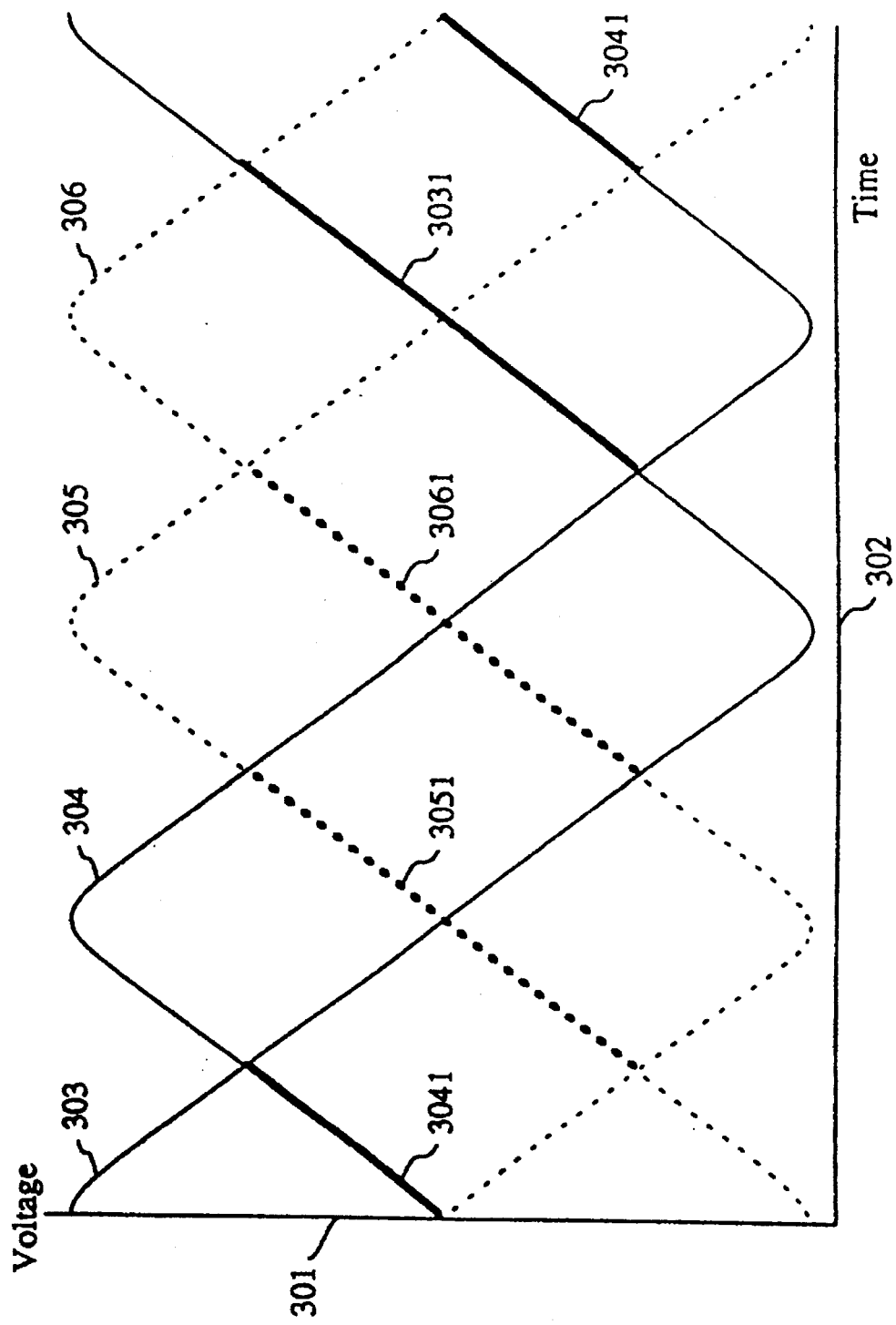
FIG. 3 is a graph showing as a function of time the voltage output from the optical interrupters in FIG. 2 and also from inverters connected to each optical interrupter.

The intensities of the light emitting diodes within interrupters 202 and 203 are set automatically so that the maximum output of each interrupter and an associated amplifier is exactly 5.0 volts. The waveforms received (as a function of time) from these interrupter-amplifier combinations are shown in FIG. 3. Ordinate 301 is voltage (0 to 5 volts) and the abscissa 302 is time. The waveform received from interrupter 202 is curve 303, and the waveform received from interrupter 203 is curve 304.

Figure 4:
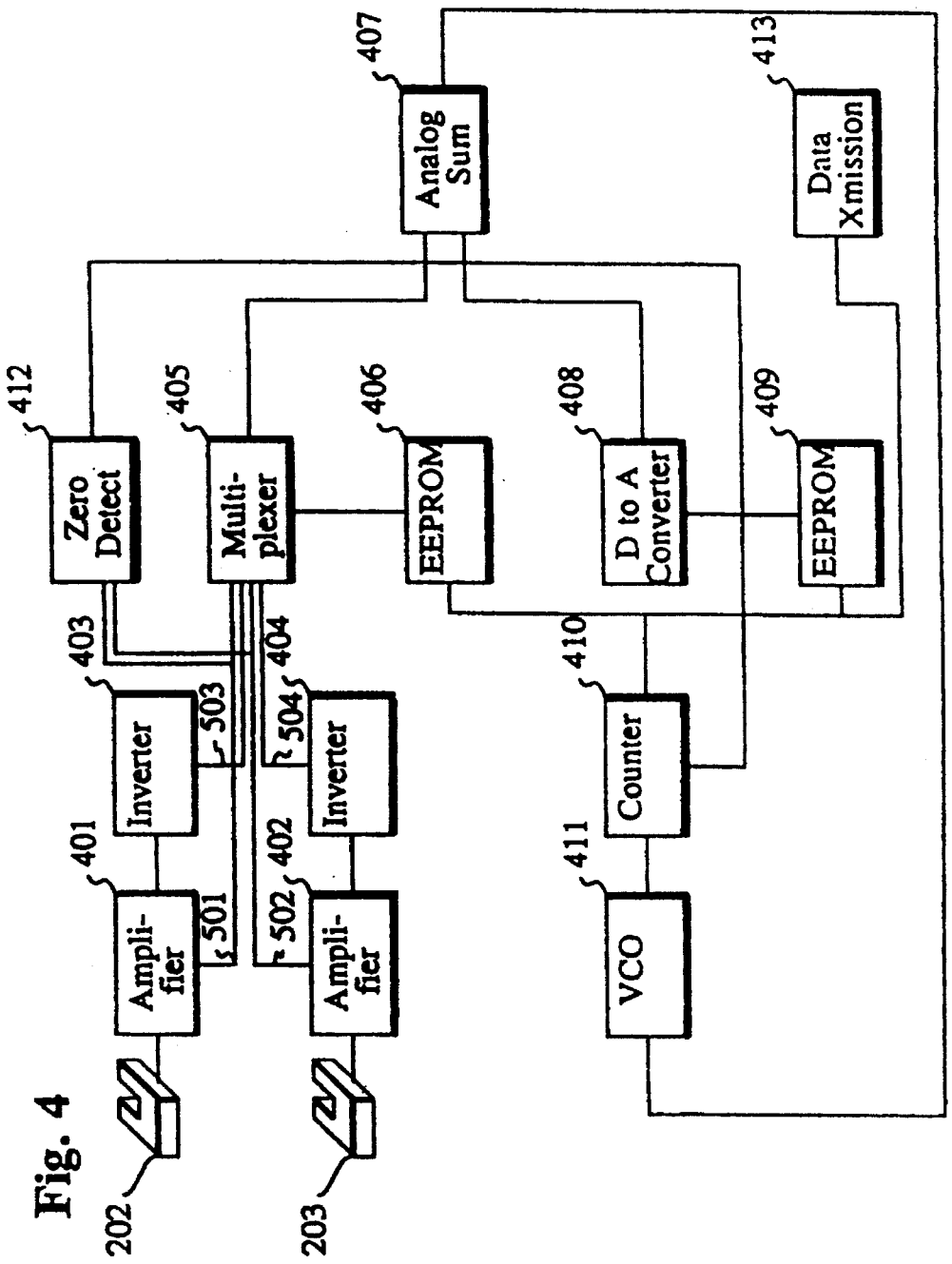
FIG. 4 is a block diagram of a control system consistent with the present invention, as well as the primary objects connected to that control system.

The circuitry used to obtain clocking signals is shown in block diagram fashion in FIG. 4. An amplifier (401 and 402) is connected to each interrupter (202 and 203), and the outputs of these amplifiers (the aforementioned curves 303 and 304) are produced on lines 501 and 502, respectively. Following each amplifier is an inverter (403 and 404), which produces inverted signals on lines 503 and 504, respectively. If the output of an interrupter is v, then the output of the corresponding inverter is (5-v) volts. In FIG. 3, the output of inverter 403 is shown as dashed curve 305, and the output of inverter 404 is shown as dashed curve 306.

In FIG. 4 an analog multiplexer, 405, selects among the four signals represented as curves 303, 304, 305, and 306 and found on lines 501, 502, 503 and 504. Multiplexer 405 is controlled by data from EEPROM 406 to select as a function of time the parts of these curves which are shown in darker trace, namely portions 3031, 3041, 3051, or 3061. EEPROM 406 is programmed so as to select the proper one of four voltages appropriate for various positions.

A reference voltage which is representative of an expected value for an expected rotational position of the encoder disk for a particular clock cycle is provided by D/A converter 408 and EEPROM 409. D/A converter 408 is programmed so as to produce an inverse of the voltage which would be appropriately seen at the output of multiplexer 405 for any given spatial position. The output of D/A converter 408 is summed with that from multiplexer 405 in analog summer 407, which preferably contains an amplifier component having a gain which is set so as to obtain the desired degree of precision. The output of summer 407 is a clocking control signal provided to a frequency control input to VCO 411, which drives counter 410, whose count is used as an address input to EEPROMs 406 and 409. VCO 411 is "tunable", i.e. it is of a type which runs faster as its frequency control input is higher, and slower if that input is lower in voltage (e.g. TI or Motorola part 74LS628N, with said input being the "frequency control" input). EEPROM 409 provides a data input to D/A converter 408, previously mentioned.

Counter 410 contains a count which represents the pixel position of the drum. If it is exactly correct, the output of analog summer 407 will be at its nominal value (e.g. 2.5 volts). If, however, the drum has rotated further forward than what would be appropriate for that count in counter 410, then the output of analog summer 407 is higher than 2.5 volts, and VCO 411 speeds up somewhat. Similarly, if the counter is ahead of the drum, the output of the summer will be lower than 2.5 volts, and VCO 411 slows down. It should be noted that because the multiplexer 405 is used, excessive rotation of the drum is always represented by a more positive summer (407) output; thus stability of operation is obtained.

Using the preferred positional sensing means 120 described herein, the desired degree of resolution may be obtained. The space between rulings is resolvable to one of 512 steps, which exceeds the resolvability of 214 steps is that is needed. Moreover, a stability of 1/2136 of the distance between rulings is needed. The output of D/A converter 408 is stable over time, and the behavior of the interrupters 202 and 203 is stable, so it can be expected that the circuit behavior should be stable. Examination of images prepared with the imager confirm that the desired stability is obtained.

On the other hand, in some conventional positioning systems which utilize rulings to provide positioning data in other areas, extremely close spacings in rulings are used, and four counts are obtained per ruling cycle. Therefore, to obtain the desired resolution of 64,200 steps per revolution with an encoder wheel diameter of 7.6" would require rulings spaced 672 per inch (0.74 mil line with 0.74 mil space). This is difficult, if not impossible, to manufacture with existing technology; moreover, any dust which might accumulate on the encoder wheel may cause catastrophic errors (permanent loss of up to 4 counts per bridged ruling pair).

Dust may accumulate on the encoder wheel disclosed herein; however, the effect is not catastrophic, as the change is spread out over a comparatively wide region so that the effect is (desirably) not noticeable.

It should be noted that the circuitry of the present invention is also self-correcting. If a very large dust particle or other imperfection occurs, VCO 411 will continue to advance, albeit more slowly than is normally the case. Once the artifact is passed, the difference between count in counter 410 and actual drum position is not large, so the system will quickly resynchronize. Prior art systems are generally not as immune to artifacts.

The range of speeds over which synchronization will occur may be made wider or narrower, depending on the range of VCO (411) speeds. It has been found that the best stability is obtained if the gain of summer 407 is set so as to permit about a 2:1 range in speeds. A microprocessor system (not shown) provides an input to the "range" input of the VCO so as to position the desired speed in about the center of the VCO range. With this additional circuitry, an overall speed range in excess of 10:1 is possible.

A method of sensing a reference position is also needed. This may be done with a separate encoder with a single "start of scan" line, but through the use of the teachings of the subject invention the cost of that separate encoder may be avoided by having a region of the encoder, 204 in FIG. 2, filled in over at least 3 rulings. When that part of the encoder is viewed by the interrupters 202 and 203, both outputs will fall to approximately zero output. This unique situation is detected by a zero detect circuit 412 shown in FIG. 4, which presents an output only when both inputs are near zero volts. This output may be connected to the "clear" input of counter 410. More than one "clear" signal may be generated, but that is not of any concern since there is generally a small region of the drum dedicated to film or paper clamps where no imaging occurs. After the last "clear" signal is generated, the counter 410 may then reach synchronization with the drum position within a short time. The trailing edge of the "clear" signal might not be exactly timed, but this is not of concern since the circuitry will automatically synchronize as long as this signal is approximately correct in time.

The output of counter 410 is also used as an input to data transmission block 413 to control the clocking of data which is imaged. This output, or a similar output driven by the same inputs as received by counter 410, is used as an input to a memory containing image data. The outputs of this memory are used to control the intensities of the beams of light used for imaging. Therefore, through the use of the present invention, the clocking of data will be substantially synchronized with the mechanical rotation of the drum, as deviations from expected mechanical positions will be compensated for in the rate of image data flow.

The data provided to the EEPROMs 406 and 409 via data transmission block 413 preferably reflects the diameter of the drum and the desired resolution. By varying this data, different resolutions may be obtained and/or compensations for various film or paper thicknesses may be made.

Some additional increase in smoothness may be obtained if, in addition to the four inputs shown to multiplexer 405, four additional inputs are obtained which are analog averages of other signals. Without this circuitry, the sequence of voltages selected might be 303, 304, 305, 306 seen on lines 501, 502, 503, 504, respectively. With this circuitry, the sequence might be 303; (average of 303 and 304); 304; (average of 304 and 305); 305; (average of 305 and 306); 306; (average of 306 and 303); 303; etc. Other combinations are also possible.

The artwork for the preferred encoder wheel 122 is generated as follows: A computer program generates a file which is interpreted by a Gerber photoplotter, the same type of device as is commonly used to generate printed circuit board artwork. The Gerber photoplotter has a resolution of 0.0001" which is good, but for this purpose not perfect. Thus the encoder is characterized.

A microprocessor system (not shown) turns the drum at a more or less constant speed and senses the output of amplifiers 401 and 402. This data is output to a conventional 486 PC (personal computer). A program stretches or compresses the data so that peaks are uniformly and precisely spaced in address space. The data is interpolated. For each position of the drum, the desired multiplexer input is chosen as being the one of the four inputs which has a rising output as a function of time and closest to the central voltage (i.e., portions 3031, 3041, 3051 and 3061 seen in FIG. 3). Also for each position of the drum, the expected multiplexer (405) output is determined. This data is programmed into the flash EEPROMs 406 and 409 in a manner understood by those skilled in the art. In this way, any imperfection in the encoder wheel is compensated for in the programming.

The rate of change of counter 410, and the output of analog summer 407, may also be of use to the microprocessor system in maintaining as precise as possible rates of drum rotation. According to another preferred embodiment, the count in counter 410 may be compared to an expected count, based on the last sampled count and a separate stable clock which shows elapsed time. Based on errors in this count from counter 410, the motor voltage may be increased or decreased. Of course, it is not possible to hold motor velocity without error, but with this method it may be possible to keep it to within +/–0.5%.

Those skilled in the art will recognize that many embodiments other than the above preferred embodiment are possible within the scope of this invention. The encoder system of the present invention could be used to generate clocks for a polygon mirror scanning system as well as for an external drum scanner.

Also, a digital or other representation of the positional and reference signals could be used to control VCO 411. An arithmetic operation may then be used to compare the signals instead of analog summer 407. Other signal comparison and closed-loop control mechanisms may also be implemented in the alternative.

In addition, the number of optical interrupters may be more than two. One requirement on the optical interrupters is that among the interrupter outputs and their inverted outputs, it is preferable to configure the system to find one of the signals which is reliably increasing in voltage with a certain direction of drum rotation.

The number of bits in the D to A converter may be other than 8 bits; with higher resolution, increased accuracy may be obtained. Of course, the number of lines on the encoder may also be greater or fewer than disclosed herein.

The analog multiplexer may also be replaced with multiplying d/a converters on each line, with data inputs obtained so as to accomplish the same action as indicated in the preferred embodiment, i.e. selection of data lines which provide the greatest rate of change of data with rotation, and provide the proper sense (direction) of change of data with rotation.

The above discussion, examples and embodiments illustrate my current understanding of the invention. However, one skilled in the art will appreciate that various additional changes may be made without departing from the spirit and scope of the invention. Thus, the invention resides wholly in the claims hereafter appended.

I claim:

1. An imaging apparatus for forming an image on photosensitive media comprising:
    (a) imaging means for applying at least one light beam to a photosensitive media, the imaging means having means for receiving image data;
    (b) media transport means for moving the photosensitive media relative to the imaging means;
    (c) data transmission means for providing a flow of image data to the imaging means, the data transmission means having means for receiving a clocking signal, wherein the rate of transmission of the image data is controlled by the clocking signal; and
    (d) synchronization means for synchronizing the data transmission means with the media transport means, the synchronization means including:
        (i) positional sensing means for generating a positional signal representative of the position of the photosensitive media relative to the imaging means, the positional sensing means generating the positional signal as a periodic signal having a magnitude between a range of values;
        (ii) clocking means for generating the clocking signal, the clocking means being tunable among a plurality of frequencies by a clocking control signal; and
        (iii) control means for comparing the magnitude of the positional signal from the positional sensing means with a magnitude of a reference positional signal representative of an expected position of the photosensitive media, the control means having means for providing the clocking control signal to the clocking means to tune the clocking means such that the frequency of the clocking signal is adjusted to compensate for a deviation of the position of the photosensitive media from its expected position; whereby image data is transmitted by the data transmission means in synchronization with the movement of the photosensitive media.

2. The imaging apparatus of claim 1, wherein the photosensitive media is disposed about a substantially cylindrical drum and wherein the media transport means moves the photosensitive media relative to the imaging means by rotating the drum.

3. The imaging apparatus of claim 2, wherein the positional sensing means comprises an encoder disk operatively connected to the drum such that a rotation of the drum induces a rotation of the encoder disk, wherein the positional signal is representative of a rotational position of the photosensitive media relative to the imaging means.

4. The imaging apparatus of claim 3, wherein the encoder disk includes a radial ruling having a plurality of alternating transparent and opaque portions disposed circumferentially about the encoder disk, and wherein the positional sensing means further comprises first and second optical interrupters disposed about the periphery of the encoder disk and configured to sense the opacity of the radial ruling, and wherein the first and second optical interrupters provide first and second output signals, respectively.

5. The imaging apparatus of claim 4, wherein the first and second optical interrupters are spaced about the periphery of the encoder disk such that the first and second output signals are 90° out of phase with one another.

6. The imaging apparatus of claim 5, wherein the positional sensing means further comprises multiplexing means for selecting one of the first and second output signals to be provided as the positional signal in response to a select signal provided by the control means.

7. The imaging apparatus of claim 6, wherein the positional sensing means further comprises first and second inverters, operatively connected to receive the first and second output signals, respectively, and provide first and second inverted signals, respectively, and wherein the multiplexing means is configured to select one of the first output, second output, first inverted and second inverted signals to be provided as the positional signal in response to a select signal provided by the control means.

8. The imaging apparatus of claim 7, wherein the positional sensing means further comprises first, second, third and fourth averagers, the first averager operatively connected to receive the first and second output signals and provide a first averaged signal, the second averager operatively connected to receive the second output and first inverted signals and provide a second averaged signal, the third averager operatively connected to receive the first and second inverted signals and provide a third averaged signal, and the fourth averager operatively connected to receive the second inverted and first output signals and provide a fourth averaged signal, and wherein the multiplexing means is configured to select one of the first output, second output, first inverted, second inverted, first averaged, second averaged, third averaged, and fourth averaged signals to be provided as the positional signal in response to a select signal provided by the control means.

9. The imaging apparatus of claim 6, wherein the control means comprises:

(a) selecting means for providing the select signal to the multiplexing means such that the positional signal is generally increasing in voltage; and (b) reference means for generating the reference positional signal, wherein the reference positional signal represents an expected position of the photosensitive media relative to the imaging means.

10. The imaging apparatus of claim 9, wherein the control means further comprises a counter, operatively connected to receive the clocking signal, for providing a count value representative of a number of oscillations of the clocking signal, and wherein:

(a) the selecting means includes a first memory operatively connected to receive the count value as an address input, wherein the first memory is preprogrammed to output select signals based upon the count value received from the counter; and (b) the reference means includes a second memory operatively connected to receive the count value as an address input, wherein the second memory is preprogrammed to output a reference positional signal which is representative of the expected position of the photosensitive media for the count value received from the counter.

11. The imaging apparatus of claim 10, wherein the control means comprises an analog summer, operatively connected to receive and sum the positional signal and the reference positional signal, and operatively configured to provide the sum as the clocking control signal, and wherein the reference means further includes a digital-to-analog converter configured to receive a digital representation of the reference positional signal from the second memory and provide an analog representation thereof to the analog summer.

12. The imaging apparatus of claim 10, further comprising zero detect means, operatively connected to a counter reset input on the counter, for resetting the counter for each complete revolution of the photosensitive media relative to the imaging means.

13. The imaging apparatus of claim 10, wherein the radial ruling on the encoder disk includes an opaque zero detect portion thereon sized so as to span the spacing between the first and second optical interrupters, wherein the zero detect means resets the counter when both of the first and second optical interrupters detect the zero detect portion of the encoder disk.

14. The imaging apparatus of claim 1, wherein the control means comprises an analog summer, operatively connected to receive and sum the positional signal and the reference positional signal, and operatively configured to provide the sum as the clocking control signal.

15. The imaging apparatus of claim 14, wherein the clocking means comprises a voltage-controlled oscillator.

16. An apparatus for synchronizing dataflow with movement of a photosensitive media in an imaging system of the type having media transport means for moving the photosensitive media relative to an imaging means which applies at least one light beam to the photosensitive media and data transmission means for providing a flow of image data to the imaging means at a rate determined by a clocking signal, the apparatus comprising:

(a) positional sensing means, operatively connected to the media transport means, for generating a positional signal representative of the position of the photosensitive media relative to the imaging means, the positional sensing means generating the positional signal as a periodic signal having a magnitude between a range of values;

(b) clocking means for generating a clocking signal, the clocking means being tunable among a plurality of frequencies by a clocking control signal; and (c) control means for comparing the magnitude of the positional signal from the positional sensing means with a magnitude of a reference positional signal representative of an expected position of the photosensitive media, the control means having means for providing the clocking control signal to the clocking means to tune the clocking means such that the frequency of the clocking signal is adjusted to compensate for the deviation of the position of the photosensitive media from its expected position; whereby image data is transmitted in synchronization with the movement of the photosensitive media.

17. A method for synchronizing dataflow with movement of a photosensitive media in an imaging system of the type having media transport means for moving the photosensitive media relative to an imaging means which applies at least one light beam to the photosensitive media and data transmission means, tunable among a plurality of frequencies by a clocking control signal, for providing a flow of image data to the imaging means at a rate determined by a clocking signal, the method comprising the steps of:

(a) sensing the position of the photosensitive media relative to the imaging means and generating a positional signal representative thereof, wherein the positional signal is a periodic signal having a magnitude between a range of values;

(b) comparing the magnitude of the positional signal with a magnitude of a reference positional signal representative of an expected position of the photosensitive media and generating a clocking control signal having a component representing a deviation of the position of the photosensitive media from its expected position; and (c) applying the clocking control signal to the data transmission means such that the frequency of the clocking signal is adjusted to compensate for the deviation of the position of the photosensitive media from its expected position; whereby the image data is transmitted in synchronization with the movement of the photosensitive media.

18. An imaging apparatus for forming an image on photosensitive media comprising:
   (a) a substantially cylindrical drum supporting a photosensitive media;
   (b) imaging means for applying at least one light beam to the photosensitive media, the imaging means having means for receiving image data;
   (c) media transport means for moving the photosensitive media relative to the imaging means by rotating the drum;
   (d) data transmission means for providing a flow of image data to the imaging means, the data transmission means having means for receiving a clocking signal, wherein the rate of transmission of the image data is controlled by the clocking signal; and
   (e) synchronization means for synchronizing the data transmission means with the media transport means, the synchronization means including:
      (i) positional sensing means for generating a positional signal representative of the position of the photosensitive media relative to the imaging means, wherein the positional sensing means comprises:
         (1) an encoder disk operatively connected to the drum such that a rotation of the drum induces a rotation of the encoder disk, wherein the positional signal is representative of a rotational position of the photosensitive media relative to the imaging means, and wherein the encoder disk includes a radial ruling having a plurality of alternating transparent and opaque portions disposed circumferentially about the encoder disk;
         (2) first and second optical interrupters disposed about the periphery of the encoder disk and configured to sense the opacity of the radial ruling, wherein the first and second optical interrupters provide first and second output signals, respectively, and wherein the first and second optical interrupters are spaced about the periphery of the encoder disk such that the first and second output signals are 90° out of phase with one another; and
         (3) multiplexing means for selecting one of the first and second output signals to be provided as the positional signal in response to a select signal;
      (ii) clocking means for generating the clocking signal, the clocking means being tunable among a plurality of frequencies by a clocking control signal; and
      (iii) control means for comparing the positional signal from the positional sensing means with a reference positional signal representative of an expected position of the photosensitive media, the control means having means for providing the clocking control signal to the clocking means to tune the clocking means such that the frequency of the clocking signal is adjusted to compensate for a deviation of the position of the photosensitive media from its expected position, and the control means providing the select signal to the multiplexing means; whereby image data is transmitted by the data transmission means in synchronization with the movement of the photosensitive media.

19. An imaging apparatus for forming an image on photosensitive media comprising:
   (a) imaging means for applying at least one light beam to a photosensitive media, the imaging means having means for receiving image data;
   (b) media transport means for moving the photosensitive media relative to the imaging means;
   (c) data transmission means for providing a flow of image data to the imaging means, the data transmission means having means for receiving a clocking signal, wherein the rate of transmission of the image data is controlled by the clocking signal; and
   (d) synchronization means for synchronizing the data transmission means with the media transport means, the synchronization means including:
      (i) positional sensing means for generating a positional signal representative of the position of the photosensitive media relative to the imaging means, wherein the positional sensing means comprises:
         (1) first and second sensors respectively providing first and second output signals; and
         (2) multiplexing means for selecting one of the first and second output signals to be provided as the positional signal in response to a select signal;
      (ii) clocking means for generating the clocking signal, the clocking means being tunable among a plurality of frequencies by a clocking control signal; and
      (iii) control means for comparing the positional signal from the positional sensing means with a reference positional signal representative of an expected position of the photosensitive media, the control means having means for providing the clocking control signal to the clocking means to tune the clocking means such that the frequency of the clocking signal is adjusted to compensate for a deviation of the position of the photosensitive media from its expected position, and the control means providing the select signal to the multiplexing means; whereby image data is transmitted by the data transmission means in synchronization with the movement of the photosensitive media.

* * * * *

UNITED STATES PATENT AND TRADEMARK OFFICE
CERTIFICATE OF CORRECTION

PATENT NO. : 5,565,906

DATED : October 15, 1996

INVENTOR(S) : David J. Schoon

It is certified that error appears in the above-identified patent and that said Letters Patent is hereby corrected as shown below:

On column 2, line 62, please delete "filed on an even date herewith,"

On column 4, lines 46 and 47, please delete "and 07/884,408 (filed on Jan. 28, 1992 and May 18, 1992, respectively)" and substitute therefore --(filed on January 28, 1992, now abandoned) and 07/884,408 (filed on May 18, 1992, now issued as U.S. Patent No. 5,434,600),--

Signed and Sealed this

First Day of April, 1997

Attest:

BRUCE LEHMAN

Attesting Officer

Commissioner of Patents and Trademarks